United States Patent [19]

Crosby

[11] 4,359,482

[45] Nov. 16, 1982

[54] FLUID SHORTENING COMPOSITION HAVING ANTI-GUMMING PROPERTIES

[75] Inventor: Thomas G. Crosby, Cincinnati, Ohio

[73] Assignee: The Procter & Gamble Company, Cincinnati, Ohio

[21] Appl. No.: 948,136

[22] Filed: Oct. 3, 1978

Related U.S. Application Data

[63] Continuation-in-part of Ser. No. 841,405, Oct. 12, 1977, abandoned.

[51] Int. Cl.$^3$ .......................... A23D 5/00; A23L 1/01
[52] U.S. Cl. .................................. 426/606; 426/653; 426/662; 426/438; 426/439; 426/523
[58] Field of Search ............... 426/601, 606, 607, 609, 426/610

[56] References Cited

U.S. PATENT DOCUMENTS

| | | | |
|---|---|---|---|
| 1,037,881 | 9/1912 | Ellis | 426/607 |
| 1,070,331 | 8/1913 | Ellis | 426/607 |
| 2,050,528 | 8/1936 | Grettie | 426/610 |
| 2,521,219 | 9/1950 | Holman et al. | 426/606 |
| 2,607,695 | 8/1952 | Ayers et al. | 426/607 X |
| 2,815,285 | 12/1957 | Holman et al. | 426/606 |
| 3,415,660 | 12/1968 | Purves et al. | 426/610 |
| 3,443,966 | 5/1969 | Reid | 426/601 |
| 3,595,674 | 7/1971 | Shaffer et al. | 426/607 |

*Primary Examiner*—Robert A. Yoncoskie
*Attorney, Agent, or Firm*—Richard C. Witte; Eric W. Guttag; Nancy S. Mayer

[57] ABSTRACT

A fluid shortening useful in the pan frying or griddling of foodstuffs is described. The composition comprises an edible triglyceride base fat wherein the acyl groups have from 16 to 22 carbon atoms and an amount in the range of from about 0.05% to about 9.8% effective to reduce the gumming tendencies of the triglyceride base fat composition, of a triglyceride having acyl groups of from 8 to 14 carbon atoms. The composition is useful primarily in pan frying or griddling operations and enables such operations to be performed while minimizing the tendency of the shortening composition to form gum or varnish-like deposits on the surfaces of frying and griddling utensils or equipment.

16 Claims, No Drawings

FLUID SHORTENING COMPOSITION HAVING ANTI-GUMMING PROPERTIES

RELATED APPLICATIONS

This application is a continuation-in-part of copending application Ser. No. 841,405 filed Oct. 12, 1977, now abandoned.

BACKGROUND OF THE INVENTION

This invention relates to a fluid shortening composition useful in pan frying or griddling of foodstuffs. More particularly, it relates to a fluid pan and griddling fat useful in the frying or griddling of foodstuffs with minimized tendencies of the fat to form gum or varnish-like deposits upon the surfaces of pan or griddling utensils or equipment.

The employment of glyceride fat compositions in the pan frying or griddling of foodstuff materials has been common-place in home, institutional, and commercial cooking operations. Fat compositions intended primarily for frying and griddling operations have comprised a significant segment of commercial shortening and oil products. The frying or griddling of foodstuff materials generally involves the application of a small quantity or film of fat or oil upon a cooking surface which is subjected to high temperatures. Typically, the cooking surface will be subjected to temperatures of 250° F. or higher with the result that the formation of gum deposits upon the cooking surface is observed. Frequently, thin-film gumming of the fat or oil will be manifested by the darkening of fat or oil on the cooking surface and the appearance of a varnish-like deposit.

The formation of gum or varnish-like deposits on the cooking surfaces of utensils or equipment is a particularly disadvantageous occurrence where the equipment is subjected to the demands of high volume cooking operations, as in the fast-food trade, and where disassembly of equipment or repeated cleaning operations is difficult or impractical. In the fast-food trade, for example, it is common to subject buns to a toasting or frying operation where a pan or griddling fat is applied to the buns and the buns are contacted with a heated surface for toasting. Prolonged heating of the cooking surface and the toasting of a volume of buns frequently results in the formation of unsightly varnish-like deposits. Such deposits can create an unhygienic condition, cause sticking of foodstuff materials to the cooking surface, and reduce the efficiency of the heating or cooking operation. The varnish-like deposits are often difficult to remove from the cooking surface and are sometimes removed with the aid of a dilute solution of lye or physical abrasion with the aid of a detergent composition.

It will be appreciated that it would be desirable to provide a pan or griddling composition useful in frying or griddling operations without objectionable formation of thin-film gum or varnish-like deposits on the cooking surfaces. The provision of a method for reducing the gumming tendencies of a shortening in the pan frying or griddling of foodstuffs would permit the efficient frying and griddling operations without the disadvantageous formation of unsightly and difficult-to-clean deposits.

SUMMARY OF THE INVENTION

The present invention is based in part upon the discovery that the formation of gum deposits on the heated surfaces of utensils and equipment used in frying and griddling operations can be substantially reduced by including in a fluid pan or griddling fat a content of triglyceride oil having acyl groups of from 8 to 14 carbon atoms. It has been found, for example, that the incorporation of a small amount of coconut oil into a fluid pan and griddling fat will substantially reduce the amount of gumming occurring in frying and griddling operations. In its composition aspect, the present invention comprises a fluid pan and griddling composition comprising an edible triglyceride having acyl groups of from 16 to 22 carbon atoms and from about 0.05% to about 9.8% of a triglyceride having acyl groups of from 8 to 14 carbon atoms. In its method aspect, the present invention resides in a method for reducing the gumming tendencies of a pan and griddling composition which comprises frying or griddling foodstuffs on a heated surface in the presence of a fluid pan and griddling composition comprising an edible triglyceride having acyl groups of from 16 to 22 carbon atoms and from about 0.05% to about 9.8% of a triglyceride having acyl groups of from 8 to 14 carbon atoms.

Various objects, details, operations, uses advantages and modifications of the invention will be apparent from the following description.

DETAILED DESCRIPTION OF THE INVENTION

The pan and griddling composition of the invention comprises as its essential components a fluid base fat comprised of triglycerides having acyl groups predominantly in the range of from 16 to 22 carbon atoms and an amount in the range of from about 0.05% to about 9.8%, and effective to reduce the gumming tendencies of the fluid base fat, of a triglyceride having acyl groups of from 8 to 14 carbon atoms. The term "fluid fat", as used herein with reference to the base fat component, or the pan and griddling composition of the invention, refers to a triglyceride composition characterized by a fluid consistency over a normal range of room temperatures and having a sufficiently low content of glycerides of melting point higher than 60° F. as to provide, upon cooling of the composition from 100° F. to 60° F., an increase in the amount of solids of not more than about 20%. Such fluid fat will, thus, be readily pourable at room temperatures and will be appreciated as being fluid or liquid as these terms are commonly understood in the art.

The fluid fat which comprises the base fat of the frying and griddling composition of the present invention is a triglyceride composition having acyl groups predominantly in the range of from 16 to 22 carbon atoms. The fluid base fat, including any content of triglyceride hardstock, will comprise at least 90.2% by weight of the composition of the invention. The composition of the invention will normally contain minor amounts of optional emulsifiers, antioxidants or the like. Preferably, the base fat will comprise at least 95% by weight of the composition.

Any of a variety of glyceride base fat materials can be used in the formulation of the pan or griddling fat of the present invention provided that the solids content is such as to provide a fluid character as hereinbefore defined. Glycerides useful herein are edible and should consist primarily of triglycerides. They can be derived from any of the naturally occurring liquid glyceride oils such as soybean oil, cottonseed oil, peanut oil, rapeseed oil, sesame seed oil, and sunflower seed oil. Also suitable are liquid oil fractions obtained from palm oil, lard, and tallow, as, for example, by graining or directed interesterification, followed by separation of the oil.

Glycerides having SCI values greater than about 5° at 50° F. can have their SCI contents reduced to the levels useful herein by winterizing. Also suitable for use herein as glyceride base fats are the so-called low molecular synthetic fats which are certain tri- or diglycerides in which one or two of the hydroxyl groups of the glycerine have been esterified with acetic, propionic, butyric, or caproic acids and one or two of the remaining hydroxyl groups of the glycerine have been esterified with higher molecular weight fatty acids having from 12 to 22 carbon atoms. Any mixture of the above enumerated liquid glycerides can be used as the base fat for the fluid fat compositions of the invention.

As a result of the low solids content of the glyceride base fat materials at 60° F., the shortening compositions of the invention can be processed to remain liquid and stable against separation of components over normally encountered temperatures.

A preferred base fat composition comprises a suspension of a hardstock constituent in particulate form in a glyceride oil vehicle. The hardstock constituent amounts to from about 1% to about 11% by weight of the base fat, preferably from about 2% to about 5% by weight. It consists of substantially fully hydrogenated normally solid fatty triglyceride, and optionally also of normally solid fatty emulsifier. The hardstock constituent ordinarily has an iodine value of less than about 15; preferably it has an iodine value ranging from about 1 to about 12.

The normally solid fatty triglyceride in the hardstock constituent, i.e. the triglyceride hardstock, amounts to from about 1% to about 11% by weight of the base fat, preferably from about 2% to about 5%. It ordinarily contains in each of its acid moieties from about 12 to about 22 carbon atoms. It has an iodine value less than about 15; preferably it has an iodine value ranging from about 1 to about 12. It consists of from about 85% to 100% by weight of beta-tending triglyceride and from 0% to about 15% by weight of non-beta-tending triglyceride. Preferably, the triglyceride hardstock is all beta-tending triglyceride. If the triglyceride hardstock contains non-beta-tending triglyceride, the non-beta-tending triglyceride usually amounts to at least about 0.5% by weight of the triglyceride hardstock. The phrase "beta-tending" is used herein to denote triglyceride hardstock which when melted and then cooled has a propensity for crystallizing in the beta polymorphic phase rather than in either the alpha or beta-prime polymorphic phases. The phrase "non-beta-tending" hardstock is used herein to define triglyceride hardstocks which when melted and then cooled have a propensity for crystallizing in either the alpha or beta-prime polymorphic phases instead of in the beta polymorphic phase. The alpha, beta, and beta-prime polymorphic shortening phases are described in Holman and Quimby, U.S. Pat. No. 2,521,219.

The beta-tending triglyceride in the hardstock can be, for example, substantially completely saturated triglyceride fats containing major amounts, for example more than 40% of tristearin, tripalmitin, and/or symmetrical palmitodistearin. Suitable normally solid triglycerides having strong beta-forming tendencies include, for example, substantially completely hydrogenated triglyceride fats derived from soybean oil, corn oil, hazelnut oil, lard, linseed oil, olive oil, peanut oil and sunflower seed oil. Substantially completely hydrogenated soybean oil, for example, soybean oil hydrogenated to an iodine value of 8, is a preferred beta-tending triglyceride constituent.

In the finished pan or griddling fat composition substantially all of the triglyceride hardstock constituent will be present in the beta polymorphic phase. This can be achieved despite the fact that some non-beta-tending triglyceride hardstock is utilized as part of the hardstock constituent. The hardstock triglyceride will normally have a particle size in the range of from about 5 microns to about 200 microns, preferably from about 10 microns to about 100 microns. The presence of the triglyceride hardstock constituent in the beta phase and of all of the hardstock constituent in particulate form allows the successful processing of the hardstock and oil vehicle constituents into a shortening having a stable liquid or fluid state. This is because the beta phase is the most stable polymorphic phase, and beta phase triglyceride hardstock in the liquid oil tends to remain in this polymorphic state whereby the continued liquidity of the oil is not disturbed; on the other hand, liquid triglyceride hardstock crystallized in alpha and/or beta-prime phases tends to convert to the beta phase forming interlacing crystal structures and eventually result in a plastic shortening being formed. As a result of the particle size specified herein, the product is not grainy and can be processed to be exceptionally stable against gravity separation of solid and liquid components, and moreover, can be processed so as to be pourable and not unduly viscous.

The fluid fat which comprises the base fat of the frying and griddling composition of the present invention will preferably be a triglyceride having acyl groups predominantly in the range of from 16 to 22 carbon atoms and having a polyunsaturated character. While applicant does not wish to be bound by any precise theory as to the phenomena occurring in the formation of gum deposits on heated cooking surfaces, it is believed that the formation of gum or varnish-like deposits is the result primarily of polymerization reactions involving double bonds in the triglyceride base fat material. It will be appreciated, therefore, that the present invention will find special applicability to the alleviation of the gumming tendencies of triglyceride materials of polyunsaturated character. Preferred polyunsaturated triglycerides include those derived from soybean, cottonseed, peanut, safflower and sunflower seed. Fluid fats which can be utilized as the base fat of the frying and griddling composition of the invention are known in the art. Examples of such fat materials and methods for their preparation can be found in U.S. Pat. Nos. 2,815,285, issued Dec. 3, 1957 to Holman et al., and 3,595,674, issued July 27, 1971 to Shaffer et al. Other fluid fat materials can, however, be suitably employed.

An essential component of the composition of the invention is a triglyceride having acyl groups predominantly in the range of from 8 to 14 carbon atoms. It has been found that the addition of such a triglyceride to a fluid pan and griddling fat can effectively reduce the gumming tendencies of the base fat. It will be appreciated that the triglyceride material employed in the control of the gumming properties of a base fat material, is characterized by the presence of acyl groups of shorter chain length than the acyl groups which predominate in the base fat material. Thus, the base fat may, for example, be derived from soybean oil predominating in acyl groups of from 16 to 22 carbon atoms and gumming tendencies of the base oil will be controlled by the addition of a triglyceride having acyl groups in the range of from 8 to 14 carbon atoms, e.g., coconut oil.

A preferred triglyceride for addition to the fluid base fat is coconut oil which predominates in acyl groups of from 12 to 14 carbon atoms. Other short-chain triglyceride materials having an appreciable content of groups of from 8 to 14 carbon atoms can likewise be employed. Examples include palm kernel oil, babassu oil, and lauric and myristic acid triglycerides.

The triglyceride having acyl groups of from 8 to 14 carbon atoms is added to the fluid base fat in an amount effective to reduce the gumming tendencies of the base fat. Generally, such triglyceride will be added in an amount in the range of from about 0.05% to about 9.8%. Amounts substantially in excess of about 9.8% will normally be avoided in the interests of retaining the fluid character of the base fat. Amounts of the triglyceride up to about 9.8% can, however, be employed to reduce the gumming tendencies of the base fat while retaining the fluid character of the pan and griddling composition of the invention. A preferred amount of the triglyceride added to the base fat composition is from about 0.1% to about 5% by weight.

Due to the higher cost of the triglyceride, the use of the lower amounts, up to about 9.8%, and especially from about 0.1% to about 5%, to achieve a reduced gumming tendency of the base fat allows for a more economical product.

The pan and griddling composition of the invention can contain any of a variety of optional additive materials commonly employed in edible fats and oils. Thus, for example, the composition can contain emulsifiers, such as mono- and diglyceride emulsifiers, colorants or antioxidants such as the polysiloxanes.

A preferred pan frying and griddling composition will contain a small amount of lecithin, usually in the range of about 0.1% to about 0.5% weight of the composition, to provide anti-sticking properties. The lecithin component will minimize sticking of foodstuffs to utensils and equipment utilized in frying and griddling operations. Lecithin, while effective to provide antisticking properties, tends to promote gumming of the frying or griddling composition. It will be appreciated, therefore, that the present invention will find particular applicability to frying and griddling fat having a content of lecithin antistick compound.

The frying and griddling composition of the present invention can be utilized in any of a number of frying or griddling operations. As used herein, the terms "frying" and "griddling" refer to the cooking of foodstuffs on any heated surface in the presence of the fluid fat composition. Thus, pan frying operations typically practiced in the home and in institutional cooking operations are contemplated within the method of the present invention whereby the gumming tendencies of the cooking fat is effectively reduced. Griddling operations conventionally practiced in restaurant cooking are likewise contemplated. An advantageous use of the compositions of the invention is in the toasting of buns or other breads in fast-food cooking operations. Machines typically used in the fast-food trade for the cooking of buns include a flat cooking surface and a heating element for the heating of the surface to the desired cooking temperature. Typically, a bun will be sliced and the sliced surfaces will be coated with a fat composition and applied for toasting to the heated surface of the bun machine. The bun pieces are held against the heated surface with slight pressure and are transported across the heated surface and emerge from the bun machine as toasted buns. Particularly where a large number of buns are toasted, the heated surface of the bun machine will tend to accumulate gum or varnish-like deposits.

The following Examples illustrate certain preferred embodiments of the invention and are not intended as limiting the invention.

EXAMPLE I

A fluid pan and griddling shortening was prepared by combining a triglyceride base oil and an additive premix in the following manner. Fifteen pounds of base oil (a deodorized mixture of 96.5 wt. % soybean oil hardened to an I.V. of 107; 3.5 wt. % soybean oil hardened to an I.V. of 8; and approximately 4 to 6 ppm methyl silicone) was placed into a 20-quart Hobart mixing bowl. A premix was prepared by blending the following ingredients in a Waring blender for 5 minutes at low speed:

| | |
|---|---|
| Base oil (same as above) | 431.10 g |
| Flavorant | 1.02 g |
| Color | 0.36 g |
| Lecithin | 11.34 g |
| Coconut oil (deodorized) | 9.07 g |
| Total | 452.89 g |

An additional 2.09 grams of flavorant were added to the premix in the blender and the resulting mixture was blended at low speed for two minutes. The resulting mixture was added to the 15 pounds of base oil. Four pounds of base oil (same as above) was used to rinse the premix from the blender and was added to the base oil in the Hobart mixing bowl. The resulting mixture was blended for 3 minutes on the number 1 Hobart mixer setting. The resulting mixture was a fluid fat containing 0.1% coconut oil.

EXAMPLE II

A fluid pan and griddling fat was prepared following the procedure of Example II except that the amounts of base oil and coconut oil in the premix were, respectively, 422.03 g and 18.14 g. The resulting composition contained 0.2 wt.% coconut oil.

Dish Gum Test

The composition of Example I was evaluated for gum formation employing a dish gum test which was conducted in the following manner. A continually renewing thin film of oil was formed by rotating on a slant, four metal containers of test oil placed on the surface of a heated aluminum block. The metal containers were shallow recessed cups into which one gram each of test oil was placed. By rotation of the heated aluminum block at a slant, the test oil in each cup was allowed to form a thin film of oil on the cup surface in a continually renewing manner. The aluminum block was heated to a temperature of 500° F. After allowing the test oil to be subjected to heating in the manner described for a period of two hours, the cups were removed from the heated surface and allowed to cool. The ungummed oil was removed from the cups by rinsing with solvent. After solvent residue was allowed to evaporate, the weight of gum in each cup was determined and an average was determined. The amount of gum formed as the result of the dish gum test is expressed as wt. % of test oil.

Bun Machine Test

The compositions of Examples I and II were evaluated using a bun machine for the toasting of buns. Test fat was rolled on the surface of each bun, and the buns were moved along a heated plate, the fat serving as a heat-transfer medium to evenly toast the buns. The bun toaster was comprised of a plate heated with a heating element providing a temperature on the surface of the plate of 420°–430° F. Before each test of fat material, the heating surface of the machine was thoroughly cleaned. After toasting of a number of buns, the build-up of gum on the heating surface was subjectively estimated by a panel of judges. The amount of gumming was judged as percentage of the area of the heated surface covered with gum taking into account thickness of gum deposits. The percentage of area covered with gum was divided by the number of buns toasted to provide a gum test evaluation expressed in %gum/bun.

The result of the Test Gum and Bun Machine tests are set forth in Table I.

TABLE I

| | COMPOSITION | | |
|---|---|---|---|
| | Without Coconut Oil (Control)* | With 0.1 Wt. Coconut Oil (Example I) | With 0.2 Wt. % Coconut Oil (Example II) |
| Dish Gum Test Results, | | | |
| Wt. % gum | 42 | 36 | — |
| Bun Machine Results, | | | |
| % gum/bun | 0.08 | 0.03 | 0.03 |

*Prepared in the manner of EXAMPLE I except that 9.07 gm of coconut oil replaced by equal weight of base oil.

What is claimed is:

1. A fluid shortening composition comprising an edible fluid triglyceride base fat having acyl groups of from 16 to 22 carbon atoms and containing from about 1% to about 11% by weight of added triglyceride hardstock; an amount of a triglyceride having acyl groups of from 8 to 14 carbon atoms in the range of from about 0.05% to about 5% by weight of the composition and effective to reduce the gumming tendencies of the base fat; and from about 0.1% to about 0.5% of lecithin by weight of the composition.

2. The composition of claim 1 wherein the fluid triglyceride base fat contains from about 2% to about 5% by weight of a triglyceride hardstock.

3. The composition of claim 1 wherein the triglyceride hardstock has an iodine value ranging from about 1 to about 12.

4. The composition of claim 3 wherein the triglyceride hardstock is a substantially completely hydrogenated soybean oil.

5. The composition of claim 1 wherein the edible fluid triglyceride base fat having acyl groups of from 16 to 22 carbon atoms comprises soybean oil.

6. The composition of claim 1 wherein the triglyceride having acyl groups of from 8 to 14 carbon atoms comprises coconut oil.

7. The composition of claim 6 wherein the coconut oil is present in an amount of from 0.1% to about 5% by weight of the composition.

8. A method for reducing the gumming tendencies of a fluid shortening composition during cooking of a foodstuff which comprises cooking a foodstuff on a heated surface in the presence of a fluid shortening composition comprising an edible fluid triglyceride base fat having acyl groups of from 16 to 22 carbon atoms and containing from about 1% to about 11% by weight of added triglyceride hardstock; an amount of a triglyceride having acyl groups of from 8 to 14 carbon atoms in the range of from about 0.05 to about 5% by weight of the composition and effective to reduce the gumming tendencies of the base fat; and from about 0.1% to about 0.5% of lecithin by weight of the composition.

9. The method of claim 8, wherein the fluid triglyceride base fat contains from about 2% to about 5% by weight of a triglyceride hardstock.

10. The method of claim 9 wherein the triglyceride hardstock has an iodine value ranging from about 1 to about 12.

11. The method of claim 10 wherein the triglyceride hardstock is a substantially completely hydrogenated soybean oil.

12. The method of claim 8 wherein the edible fluid triglyceride base fat having acyl groups of from 16 to 22 carbon atoms comprises soybean oil.

13. The method of claim 8 wherein the triglyceride having acyl groups of from 8 to 14 carbon atoms comprises coconut oil.

14. The method of claim 13 wherein the coconut oil is present in an amount of from about 0.1% to about 5% by weight of the composition.

15. The method of claim 8 wherein the heated surface is at a temperature of at least 250° F.

16. The method of claim 15 wherein the foodstuff is a bun and wherein the fluid fat composition is applied to the bun and the bun is toasted on the heated surface.

* * * * *